May 6, 1924.

F. G. MATSON 1,492,603

METHOD OF PRODUCING A FOOD PRODUCT

Filed Feb. 23, 1924

Inventor
Francis G. Matson

By [signature]

Attorney

Patented May 6, 1924.

1,492,603

UNITED STATES PATENT OFFICE.

FRANCIS G. MATSON, OF WASHINGTON, DISTRICT OF COLUMBIA.

METHOD OF PRODUCING A FOOD PRODUCT.

Application filed February 23, 1924. Serial No. 694,707.

*To all whom it may concern:*

Be it known that I, FRANCIS G. MATSON, a citizen of the United States, residing at Washington, in the District of Columbia, have invented certain new and useful Improvements in Methods of Producing a Food Product, of which the following is a specification.

My invention relates to an edible food product, and has particular reference to such a product wherein a previously cooked sausage, such as a frankfurter, is enclosed in a casing of baked batter.

An important object of the invention is to provide an edible food product of the above mentioned character, possessing marked advantages, such as a high degree of porosity in the enclosing casing of baked batter, whereby the same may be readily digested.

A further object of the invention is to provide an edible food product of the above mentioned character having the enclosing casing of baked batter of such a character that the same will not be injuriously affected by the grease from the cooked sausage.

A further object of the invention is to provide an edible food product of the above mentioned character, which may be cooked quickly, having a highly porous or cellular enclosing casing of cooked batter, with the cellular formation extending inwardly into contacting relation with the cooked frankfurter, without becoming heavy or soggy.

Figure 1:
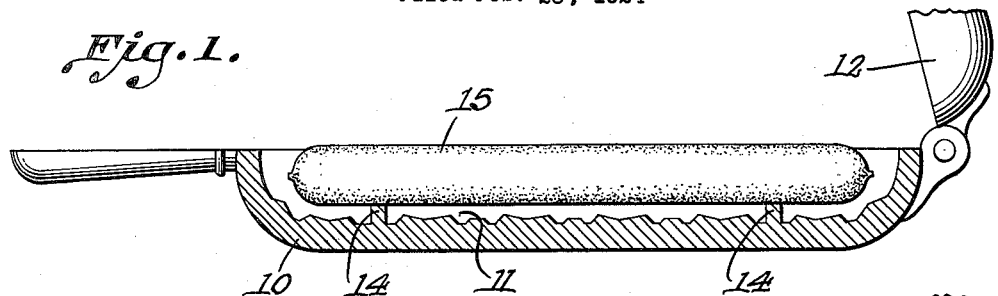
Figure 2:
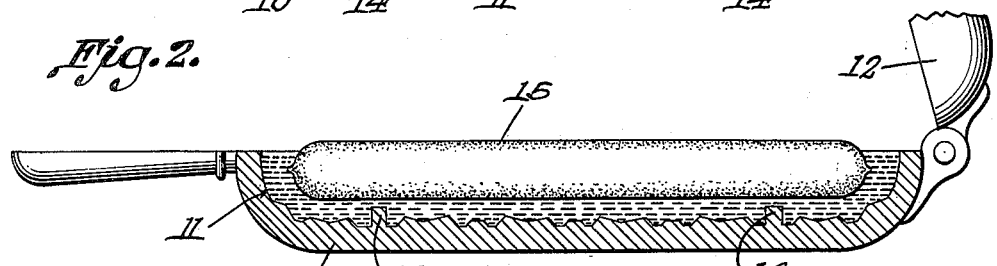
Figure 3:
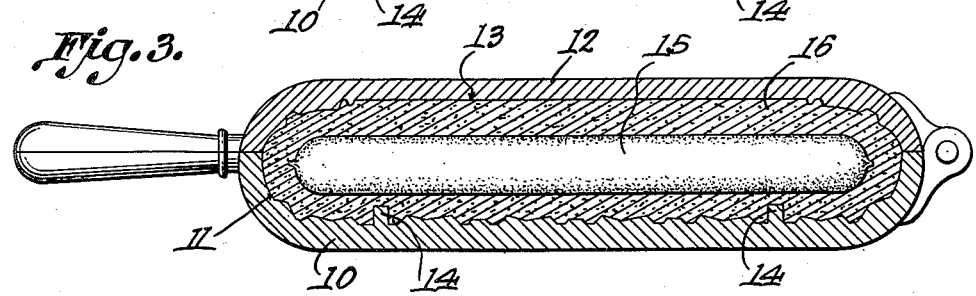
Figure 4:
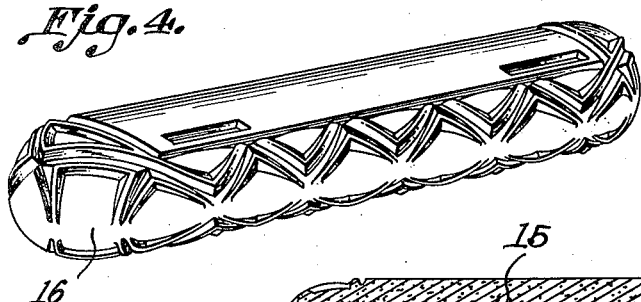
Figure 5:
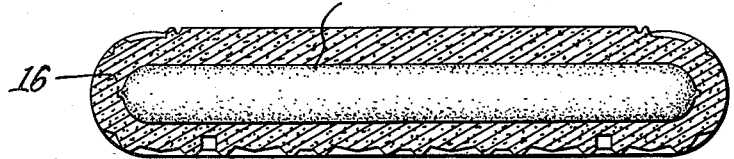

In the accompanying drawings forming a part of this specification, and in which like numerals are employed to designate like parts throughout the same, Figure 1 is a central vertical longitudinal section through the lower member of the iron, prior to the introduction therein of the batter, showing the previously cooked frankfurter supported by the retaining lugs, Figure 2 is a similar view, after the introduction of the batter into the iron, at the starting of the cooking operation, Figure 3 is a similar view through the complete iron, showing the coacting member in place, Figure 4 is a perspective view of the product, and, Figure 5 is a central longitudinal section through the same.

Figure 6:
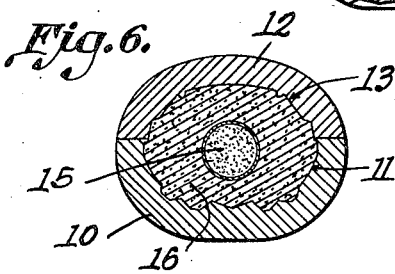

Figure 6 is a transverse section through the complete iron showing the frankfurter and batter therein, In the drawings, wherein for the purpose of illustration is shown a preferred embodiment of my invention, the numeral 10 designates the lower member of the iron, having a cavity or recess 11, of a generally elliptical shape, for molding the product into the desired shape and size. The inner surface of this recess may have suitable indentations and ribs formed therein, for effecting the proper radiation of the heat to the batter and for producing an ornamental configuration. The numeral 12 designates the upper coacting member of the iron having a similarly shaped recess 13, with the ribs and indentations, for a similar purpose. Attention is called to the fact that the recess 11 is substantially deeper than the recess 13. The numeral 14 designates a pair of supporting lugs or elements, arranged within the recess 11, and cast integral with the member 10. These supporting lugs are preferably disposed near the ends of the recess, and extend in a generally vertical direction. The previously cooked sausage or frankfurter 15, when first introduced into the recess 11, rests upon the supporting elements 14, and is thereby held in spaced relation from the bottom of the recess 11.

In the practice of the method in the production of the edible product, the lower iron member 10 is arranged upon a stove or the like and heated to a sufficiently high temperature to effect a quick and thorough cooking of the batter. The frankfurter or sausage 15 is previously completely cooked, and this is an important feature of the invention. By this previous cooking, the excess grease is removed from the frankfurter, and further the frankfurter is in a heated condition. This previously cooked frankfurter is now introduced in the recess 11 and supported in spaced relation from its bottom, by resting upon the supporting elements 14. The batter is now properly poured into the recess 11 around, upon and about the previously cooked sausage.

An important feature of the invention is the employment of a batter sufficiently thin to pour quickly and freely, and such a batter must not be confused with a dough. Dough is a product which must be kneaded, in order to properly rise, and cannot flow, and further bakes much slower than batter. The batter which is employed, as before stated, is sufficiently fluid to pour readily and bake quickly, whereby a casing is obtained which is highly cellular. As hereinbefore stated, the frankfurter is first thoroughly or properly cooked before being introduced into the iron. This is essential, as the length of time required to cook the frankfurter is considerably longer than that required to cook the batter, and any attempt to cook the frankfurter while cooking the batter, would result in failure. It has been attempted to cook a frankfurter in dough, but this has not proven satisfactory, as the grease from the frankfurter invariably works into the dough, causing the inner portion of the dough to become heavy and soggy. Further, the frankfurter cannot be properly cooked, even in dough, as it is too remote from the action of heat, and the dough would burn before the frankfurter was properly cooked.

This fluid batter when poured into the recess 11, around, about or upon the previously cooked frankfurter, at once passes beneath the frankfurter, or the lower portion thereof. The top iron member 12 is now lowered upon the lower iron member, whereby batter with the frankfurter embedded therein is completely confined in a closed space having the desired shape and size of the finished product. This fluid batter, contains sufficient and proper baking powder to cause the same to quickly rise, to produce a highly cellular structure. This rising of the batter elevates the frankfurter, to some extent, from the supporting lugs so that such frankfurter floats in the batter in a position approximately centrally of the cavity or the product. When the upper iron member is lowered in place, the rising batter immediately fills the entire cavity of the iron above the frankfurter, which becomes entirely enclosed in the casing of batter. The cooking action is continued for a suitable length of time, such as for about one-half minute. The entire iron is then inverted and the then lower iron member is heated for approximately one-half minute, until the cooking action of the other side of the product is completed. It has been found that the entire cooking operation can be effected in three-fourths of a minute. The time consumed in introducing the cooked frankfurter into the iron, and pouring in the batter, is of course very little, such as a few seconds, with the result that the finished product can be produced in the presence of the purchaser, within a minute. After the cooking, the product is of course ready to be removed from the iron, to be eaten.

The product is obtained which has an edible casing which is integral, completely surrounding and enclosing the previously cooked sausage. This casing is indicated by the numeral 16 in Figure 4. As shown therein, the casing is highly porous or cellular, and this porous casing extends inwardly into contacting relation with the frankfurter. The highly cellular character of the casing is due to the fact that I employ a relatively thin batter, in counter distinction to a dough, and secondly that the cooking is effected at a high temperature in a rapid manner, which can only be carried out by introducing the batter into the iron, in the manner described.

A further advantage in the practice of my method is that I produce a product which is highly sanitary. By the method above described, the handling of the frankfurter, as ordinarily occurs in the making of a sandwich, as by passing the same into a split roll, is dispensed with. The usual handling of the roll is also dispensed with. Further, the entire product may be produced within three-fourths of a minute, in the presence of the purchaser, assuring him that the product is sanitary, and fresh, and also stimulating interest in the product.

It is to be understood that the form of my invention herewith shown and described is to be taken as a preferred example of the same, and that various changes in the order of the steps of the method, and in the shape and size of parts of the product, may be resorted to, without departing from the spirit of my invention or the scope of the subjoined claims.

Having thus described my invention, I claim:

1. The hereindescribed method of producing an edible food product, which consists in floating a previously cooked frankfurter in a fluid batter while confining the same in an enclosed space, subjecting the batter thus confined to the action of a cooking heat to first cause the batter to rise and expand and substantially completely surround the frankfurter within the enclosed space, continuing the cooking action for completing the cooking of the expanded batter in the form of an enclosing casing, and removing the cooked product from within the enclosed space.

2. The hereindescribed method of producing an edible food product, which consists in supporting a previously cooked frankfurter in an enclosed space in the presence of a fluid batter having the frankfurter partly or wholly embedded therein, subjecting the fluid batter while thus confined in the enclosed space to the action of heat for causing the same to expand and completely fill the space around the frankfurter, continuing the heating action for cooking the expanded batter in the form of an enclosing casing, and removing the cooked product from within the enclosed space.

3. The hereindescribed method of producing an edible food product, which consists in introducing a previously cooked frankfurter into an enclosed space while maintaining the same spaced from the bottom thereof, pouring a fluid batter into the bottom of the space about the frankfurter, subjecting the batter while confined within the enclosed space to the action of heat for causing the batter to rise and expand and fill the enclosed space surrounding the frankfurter, continuing the heating action to effect the complete cooking of the batter, and removing the cooked product from within the enclosed space.

4. The hereindescribed method of producing an edible food product, which consists in holding a fluid batter in the lower portion of an enclosed space in the presence of a previously cooked frankfurter partly or wholly embedded in the upper portion of the batter, subjecting the batter to the action of heat for causing it to rise and expand and pass upwardly within the enclosed space over the top of the frankfurter, continuing the heating action to effect the complete cooking of the batter, and removing the cooked product from within the enclosed space.

5. The hereindescribed method of producing an edible food product, which consists in confining a previously cooked frankfurter in an enclosed space in the presence of a fluid batter, causing the batter to expand and substantially completely surround the frankfurter within the enclosed space by subjecting the batter to the action of heat, continuing the heating operation until the batter is completely cooked, and removing the cooked product from within the enclosed space.

In testimony whereof I affix my signature.

FRANCIS G. MATSON.